United States Patent
Cooper et al.

(10) Patent No.: US 8,909,023 B2
(45) Date of Patent: Dec. 9, 2014

(54) APPARATUS AND METHOD FOR ADJUSTMENT OF VIDEO SETTINGS

(75) Inventors: Steven L. Cooper, Whitestown, IN (US); Khelan M. Modi, Fishers, IN (US)

(73) Assignee: Shenzhen TCL New Technology Ltd., Shenzhen, Guangdong (CN)

( * ) Notice: Subject to any disclaimer, the term of this patent is extended or adjusted under 35 U.S.C. 154(b) by 254 days.

(21) Appl. No.: 13/120,415

(22) PCT Filed: Feb. 19, 2009

(86) PCT No.: PCT/US2009/034543
§ 371 (c)(1),
(2), (4) Date: Mar. 22, 2011

(87) PCT Pub. No.: WO2010/056381
PCT Pub. Date: May 20, 2010

(65) Prior Publication Data
US 2011/0176786 A1    Jul. 21, 2011

(30) Foreign Application Priority Data

Nov. 17, 2008  (CN) .......................... 2008 1 0177609

(51) Int. Cl.
| | |
|---|---|
| H04N 5/775 | (2006.01) |
| H04N 21/414 | (2011.01) |
| H04N 21/41 | (2011.01) |
| H04N 7/01 | (2006.01) |
| H04N 21/4402 | (2011.01) |
| H04N 21/485 | (2011.01) |
| H04N 5/46 | (2006.01) |

(52) U.S. Cl.
CPC ..... *H04N 21/4854* (2013.01); *H04N 21/41407* (2013.01); *H04N 21/4126* (2013.01); *H04N 21/4122* (2013.01); *H04N 7/0122* (2013.01); *H04N 21/440263* (2013.01); *H04N 5/46* (2013.01)
USPC .......................................................... 386/230

(58) Field of Classification Search
CPC ................ H04N 21/41407; H04N 21/440263; H04N 21/4854; H04N 5/46
See application file for complete search history.

(56) References Cited

U.S. PATENT DOCUMENTS

| | | | |
|---|---|---|---|
| 2006/0031889 A1 | 2/2006 | Bennett et al. | |
| 2007/0064199 A1* | 3/2007 | Schindler et al. | 353/30 |
| 2007/0287498 A1 | 12/2007 | Wang et al. | |
| 2008/0198264 A1 | 8/2008 | Balram | |
| 2009/0262661 A1 | 10/2009 | Ueda et al. | |

FOREIGN PATENT DOCUMENTS

| | | |
|---|---|---|
| JP | 11-196159 A | 7/1999 |
| KR | 10-2003-0012918 A | 2/2003 |
| KR | 10-2003-0082718 A | 10/2003 |
| KR | 10-2006-0126406 A | 12/2006 |
| WO | 2006113776 | 10/2006 |

OTHER PUBLICATIONS

International Search Report for related application PCT/US09/034543 dated Dec. 22, 2009; 11 pgs.
Extended European Search Report for European Application No. 09826468.2 issued Jan. 23, 2014.

* cited by examiner

*Primary Examiner* — Huy T Nguyen
(74) *Attorney, Agent, or Firm* — Fletcher Yoder, P.C.

(57) ABSTRACT

An electronic device includes display control logic for adjusting video settings of the electronic device in order to improve the display of portable media player files on the electronic device. The video settings may include picture settings for a display subsystem of the electronic device, video processing methods stored within a processor of the electronic device, and expansion ratios for images received from the portable media player. A method of operating the electronic device may include acquiring media file data, such as the expansion ratio and file type, from the portable media player and using the data to determine the video settings.

19 Claims, 3 Drawing Sheets

APPARATUS AND METHOD FOR ADJUSTMENT OF VIDEO SETTINGS

FIELD OF THE INVENTION

The present invention relates generally to electronic devices, such as televisions. More specifically, the present invention relates to electronic devices configured to connect to a portable media player.

BACKGROUND OF THE INVENTION

This section is intended to introduce the reader to various aspects of art that may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Portable media players are common electronic devices for storing, transporting, and playing media files, such as audio files, video files, and digital picture files. The portable media players generally are small, allowing them to be easily transported and used in a variety of environments. A small display screen may be included for viewing the files stored on the portable media player. However, the portable media players are often coupled to electronic devices, such as televisions, so that the media files may be viewed on the larger display of the electronic device. The larger display may be more suitable for viewing by a large audience or for extended periods.

Some of the media files stored on the portable media player may be designed for viewing on the portable media display, which is relatively small when compared to an electronic device display. These files may have a low pixel resolution, typically 320×240 or 640×480. In contrast, an electronic device may be configured to display files of a relatively high pixel resolution, such as 720p (1280×720), 1080i (1280×1080, 1440×1080 and 1920×1080), and 1080p (1920×1080). Because of the difference in display size (the portable media display being relatively small while the electronic device display is relatively large), some of the media files may be enlarged for display on the electronic device. However, the enlargement process may decrease the image quality, particularly when the source media file has a low resolution. For example, a blocky or blurry picture may result if a portable media player file is enlarged by a sizeable amount.

DETAILED DESCRIPTION OF THE PREFERRED EMBODIMENT

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present invention are directed to an electronic device that supports adjustment of video settings to improve the display quality of a media file stored on a portable media player and displayed on the electronic device. The adjustment may include determining a suitable expansion ratio for the portable media player file as well as determining a processing method for improving the image. The adjustment also may include changing picture settings for the electronic device, such as the contrast, sharpness, and brightness. The adjustment may be performed using video properties, such as the resolution and type of file acquired from the portable media player. In certain embodiments, some of the adjustment properties may be set by the user.

Figure 1:
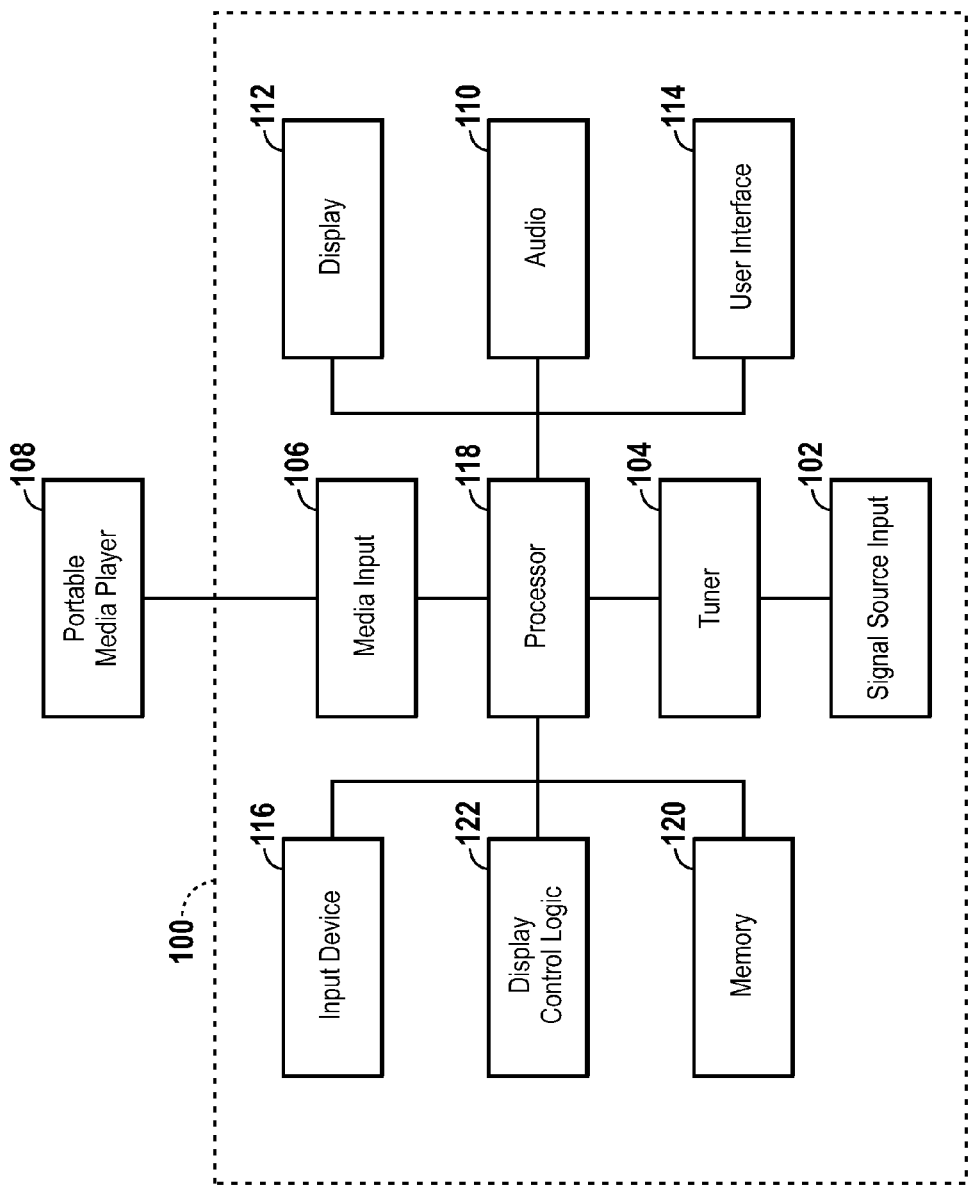
FIG. 1 is a block diagram of an electronic device in accordance with present embodiments.

FIG. 1 is a block diagram of an electronic device in accordance with an embodiment of the present invention. The electronic device is generally indicated by the reference number 100. The electronic device 100 (a television, for example) comprises various subsystems represented as functional blocks in FIG. 1. Those of ordinary skill in the art will appreciate that the some of the functional blocks shown in FIG. 1 may comprise hardware elements (including circuitry), software elements (including computer code stored on a machine-readable medium), or a combination of both hardware and software elements.

The electronic device 100 includes a signal source input 102 for receiving media to present via the electronic device 100. The signal source input 102 may include an antenna input, an RCA jack, an S-video input, a composite video input, an HDMI input, or the like. Those of ordinary skill in the art will appreciate that the signal source input 102 may be representative of multiple inputs. The signal source input 102 is configured to receive a signal that comprises video data and, in some cases, audio data. The signal received by the signal source input 102 may comprise a broadcast spectrum (e.g., if the signal source input 102 comprises an antenna input) or a single channel of video and/or audio data (e.g., if the signal source input 102 comprises a DVD player input, or the like).

In the illustrated embodiment, a tuner 104 is configured to tune a particular video program from a broadcast signal received from the signal source input 102. For example, the tuner 104 may be used to select and tune a channel from a variety of channels provided through cable television to display a program being broadcast on the tuned channel. In some embodiments, the tuner 104 may be bypassed if the signal source input 102 receives a signal that does not require tuning, such as a stored video signal. Indeed, those of ordinary skill in the art will appreciate that input signals that are not received as part of a broadcast spectrum may bypass the tuner 104 because tuning is not required to isolate a video program associated with those signals.

The electronic device 100 also includes a media input 106 for receiving media to present via the electronic device 100. The media input 106 may include a wireless connection, a serial connection, a Universal Serial Bus (USB) connection, an Inter-Integrated Circuit (I²C) connection, or other suitable connection for communicating with an external unit, such as a portable media player 108.

The portable media player 108 includes a self-contained and portable electronic device configured to store and play digital media. Moreover, the portable media player 108 includes a device that is easily transported by a user and capable of independent use in a variety of environments, such as while traveling in a plane or while working out. For example, the portable media player 108 may include an audio, video, or multi-media player such as an iPod® commercially available from Apple, Inc., a Zune commercially available from Microsoft, a LYRA™ commercially available from RCA, or the like.

The portable media player 108 may be connected to the media input 106 by a cable, such as a serial cable or I²C cable, or may communicate with the media input 106 using wireless signals. Those of ordinary skill in the art will appreciate that the media input 106 may be representative of multiple inputs allowing connection to many portable media players and/or other external devices.

An audio subsystem 110 and a display subsystem 112 of the electronic device 100 are configured to play the audio and video information received from the signal source input 102 and the media input 106. The audio subsystem 110 may include an audio amplifier and one or more speakers configured to play audio data. For example, the audio subsystem 110 may play music received from the portable media player 108. The display subsystem 112 may include a lighting source and a display, such as a liquid crystal display, a light emitting diode display, a plasma display panel, or a digital light projection display configured to play video data. In operation, the display subsystem 112 may display album art or videos received from the portable media player 108. According to certain embodiments, the display subsystem 112 may display a menu for navigating within the portable media player 108.

A user interface 114 may include a graphical user interface having a plurality of menus, viewable through the display subsystem 112. The user interface 114 may be configured to allow a user to adjust various settings and/or options for the electronic device 100. For example, a user may navigate through a series of menus to change the picture settings, such as brightness, sharpness, color, and contrast, for the electronic device 100. According to certain embodiments, the user may navigate through a menu to select preset picture settings corresponding to the type of media being played. For example, a user may select a "Cinematic" setting when watching a movie or a "Portable Media Player" setting when watching a file from a portable media player. The preset picture settings may include predetermined combinations of brightness, contrast, sharpness, color, and the like designed to optimize the display presentation of certain media types, such as a sports program or movie, or the display presentation in certain environments, such as a brightly lit room.

An input device 116, such as a remote control, may be configured to facilitate navigation within the user interface 114 and to facilitate selection of items within the user interface 114. For example, the input device 116 may be used to select a preset picture setting. The input device 116 may include control features such as buttons, dials, knobs, or the like, disposed on an outer surface of the device 100 or on a remote control configured to communicate with the device 100 via infrared signals. For example, a user may press a button, such as an arrow button, on the input device 116 to navigate between various picture settings.

A processor 118 of the electronic device 100 may be configured to control operation of the electronic device 100 and cooperate with a memory 120 and a display control logic 122. The memory 120 may store executable code, data, and instructions for the processor 118. For example, the memory 120 may be configured to hold machine-readable code for accessing and operating the portable media player 108 in accordance with present embodiments. Additionally, portions of the display control logic 122, which may include machine-readable code, may be stored on the memory 120. The processor 118 may utilize the code stored in the memory 120 in conjunction with the control logic 122 to perform certain methods in accordance with present embodiments, including adjusting display settings for the electronic device 100. The processor 118 also may be configured to perform video processing of files stored on the portable media player 108 to allow playback of the files on the electronic device 100.

According to present embodiments, the display control logic 122 may include executable code and/or logic circuitry configured to acquire media file data from the portable media player 108. The processor 118 may be configured to execute the code. In some embodiments, the executable code may be stored within the memory 120 of the device 100. In other embodiments, the control logic 122 may include a computer readable media, such as a non-volatile memory, for storing the executable code. In certain embodiments, the control logic 122 also may include a separate processor configured to execute the code.

The media file data from the portable media player 108 may include data describing a media file, such as the pixel resolution, type of media file, type of content, and the like, and may be used to adjust picture settings of the electronic device 100 to improve the display quality of media files received from the portable media player 108. The media file data also may include information identifying the portable media player, such as the brand or model number of the portable media player. According to present embodiments, protocol information and instructions stored within the memory 120 may be used to communicate with the portable media player 108. The media file data acquired from the portable media player 108 may be used by the control logic 122 to determine video settings, such as the expansion ratio, video processing algorithms, and picture settings that include brightness, contrast, sharpness, and the like.

According to present embodiments, the pixel resolution may be used to determine a suitable expansion size for the portable media player file. Media files stored on the portable media player 108 may be streamed to the electronic device 100 and played on the electronic device 100 using the display subsystem 112. However, some of the portable media player files may be designed for playback on the small display (typically less than 10 square inches) included within the portable media player 108. These files may have a relatively low pixel resolution, typically 320×240 or 640×480, that may not be suitable for maximum expansion and display on a larger electronic device display, for example 32 inches to 60 inches in diagonal. For example, a 320×240 resolution media file may be blurry and/or may contain macro blocks when displayed on a 40 inch diagonal display. To preserve the quality, the control logic 122 may be configured to determine a suitable expansion size and then limit the expansion of the media file to the suitable expansion size. If the expansion size is smaller than the size of the electronic device display, the media may be displayed on only a portion of the display. For example, a 320×240 resolution media file may be displayed within a 25 inch (diagonal) area of the 40 inch (diagonal) display.

According to present embodiments, the media file data may be used to adjust picture settings of the electronic device, such as brightness, contrast, sharpness, and the like. For example, the control logic 122 may be configured to reduce the sharpness to improve the display quality for a low resolution media file. In another example, the brightness may be reduced for a movie file to create a viewing experience more similar to that of a movie theater. In certain embodiments, the control logic 122 may be configured to apply preset picture settings to the electronic device. For example, the control logic 122 may be configured to apply a preset "Cinematic" setting to a media file that is a movie. As noted above, the preset settings may include designated combinations of brightness, contrast, color, sharpness, and other suitable picture settings. Further, in some embodiments, the control logic 122 may be configured to adjust the picture settings based on the brand or model of the portable media player. For example, a certain brand of portable media player may have a relatively subdued color output. The control logic 122 may be configured to increase some or all of the color values for the specific portable media player brand.

According to present embodiments, the media file data may be used to determine the type of video processing applied to the media file. For example, the processor 118 and memory 120 may be configured to apply several different types of video processing to media files received from the portable media player 108. The control logic 122 may be configured to select the type of video processing based on the media file data. For example, the control logic may select a complex processing algorithm that blends and smoothes the image for a low resolution media file. In another example, the control logic 122 may select a de-blocking algorithm that continuously scans the media received from the portable media player for macro blocks and responsively adjusts the sharpness setting based on the macro block properties. In certain embodiments, the type of video processing applied may be designated by the user through the user interface 118.

Figure 2:
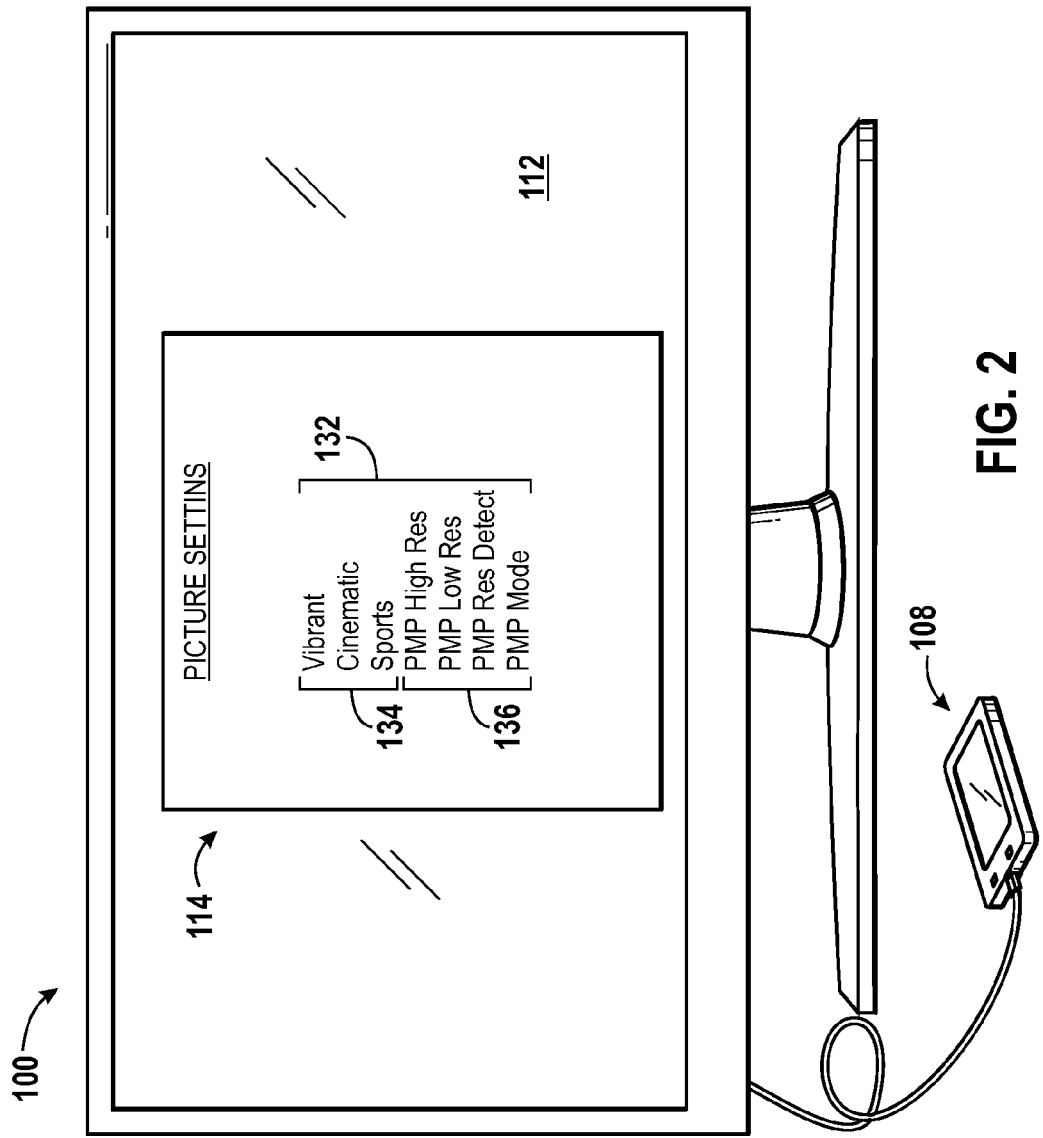
FIG. 2 is a front elevational view of an electronic device connected to a portable media player in accordance with present embodiments.

FIG. 2 depicts one embodiment of the electronic device 100 connected to the portable media player 108. In the illustrated embodiment, the electronic device 100 includes a television displaying a user interface 114. The user interface 114 includes a textual listing of the preset picture settings 132 available for the electronic device 100. The input device 116 (FIG. 1) may be used to select between the preset picture settings 132. As noted above, the preset picture settings may include predetermined combinations of picture settings, such as specific values for the brightness, sharpness, and contrast, designed to optimize viewing of certain media types or viewing in certain environments. For example, a user may select the "Vibrant" setting when operating the electronic device in a brightly lit room.

The preset picture settings 132 include general settings 134 and portable media player settings 136. The general settings may be used for media received through the signal source input 102 (FIG. 1), such as a cable broadcast or a movie on a DVD, as well as with media received through the media input 106 (FIG. 1) from a portable media player. For example, the "Vibrant" setting may be used to optimize viewing in a brightly lit room; the "Cinematic" setting may be used to optimize viewing in a dark room; and the "Sports" setting may be used to optimize viewing of a sports event. Those skilled in the art will appreciate that many different types of general settings 134 may be used for a variety of media types and environments.

Although the portable media player settings 136 may be used with all types of media, it is intended that the portable media player settings 136 be used to improve the quality of portable media player files displayed on the electronic device 100. Each portable media player setting 136 may correspond to different settings for optimizing display of a portable media file on the electronic device 100. In addition to designating picture settings, such as sharpness, contrast, and brightness, the portable media player settings 136 also may correspond to expansion rates and/or video processing algorithms.

According to present embodiments, each of the portable media player settings 136 may correspond to different picture settings, expansion rates, video processing algorithms, and combinations thereof. For example, the setting "PMP High Res" may be designed for use with portable media player files that have a resolution of at least 640×480. Upon selection of this setting, the control logic 122 may be configured to decrease the sharpness by 10% and limit the expansion size to a 50 inch diagonal display area (or smaller). The setting "PMP Low Res" may be designed for use with portable media player files that have a resolution of less than 640×480. Upon selection of this setting, the control logic 122 may be configured to decrease the sharpness by 30% and limit the expansion size to a 25 inch diagonal display area (or smaller).

The settings "PMP Res Detect" and "PMP Mode" may be designed to provide more customized adjustment of the display settings. For example, upon selection of the setting "PMP Res Detect," the control logic 122 (FIG. 1) may be configured to determine a suitable expansion rate based on the resolution. The suitable expansion rate may be determined using an algorithm or table stored in the memory 120 (FIG. 1). The control logic 122 (FIG. 1) also may be configured to select a video processing algorithm for reducing macro blocks. The video processing algorithm may be carried out by the processor 118.

The setting "PMP Mode" may be designed to provide the highest level of adjustment. For example, upon selection of the setting "PMP Mode," the control logic 122 may be configured to determine a suitable expansion rate and select a comprehensive video processing algorithm involving the generation of an improved video based on analysis of individual video frames. It should be noted that the percentages, display areas, and video processing algorithms are provided by way of example, and are not intended to be limiting. As those skilled in the art will appreciate, the control logic 122 may be configured to select any type of video processing algorithm included within the electronic device 100. Furthermore, the picture settings may be adjusted by various amounts and the adjustments may be based on percentages or numerical settings.

The portable media player settings 136 may be selected by a user through the user interface 114. In some embodiments, the user interface 114 may include a screen showing examples of videos processed under each of the portable media player settings 136. This screen may allow a user to select the type of processing that the user finds most visually pleasing. The user interface 114 also may include a screen describing each portable media player setting 136 and listing the video encoding formats, such as MPEG-4, WMV, and JPEG, suited to each setting. The descriptions may facilitate selection of a portable media player setting 136.

In some embodiments, the user interface 114 may display representative images from the portable media player 108. The electronic device 100 may be configured to retrieve images from the portable media player 108 representing a range of media file data, such as various resolutions, file types, and encoding formats. Through the user interface 114, a user may select a video processing method and/or picture settings for each representative image. The control logic 122 (FIG. 1) may be configured to apply the user selected settings to portable media player files corresponding to the representative images. Further, the control logic 122 (FIG. 1) may be configured to interpolate settings based on the user selections.

In some embodiments, the control logic 122 may be configured to automatically select the portable media player setting 136. For example, the user interface 114 may include a selectable setting configured to enable automatic selection of the portable media player setting 136. The control logic 122 may select the portable media player setting 136 based on the media file properties received from the portable media player 108. For example, if the pixel resolution for a media file is 640×480, the control logic 122 may select the setting "PMP High Res."

Figure 3:
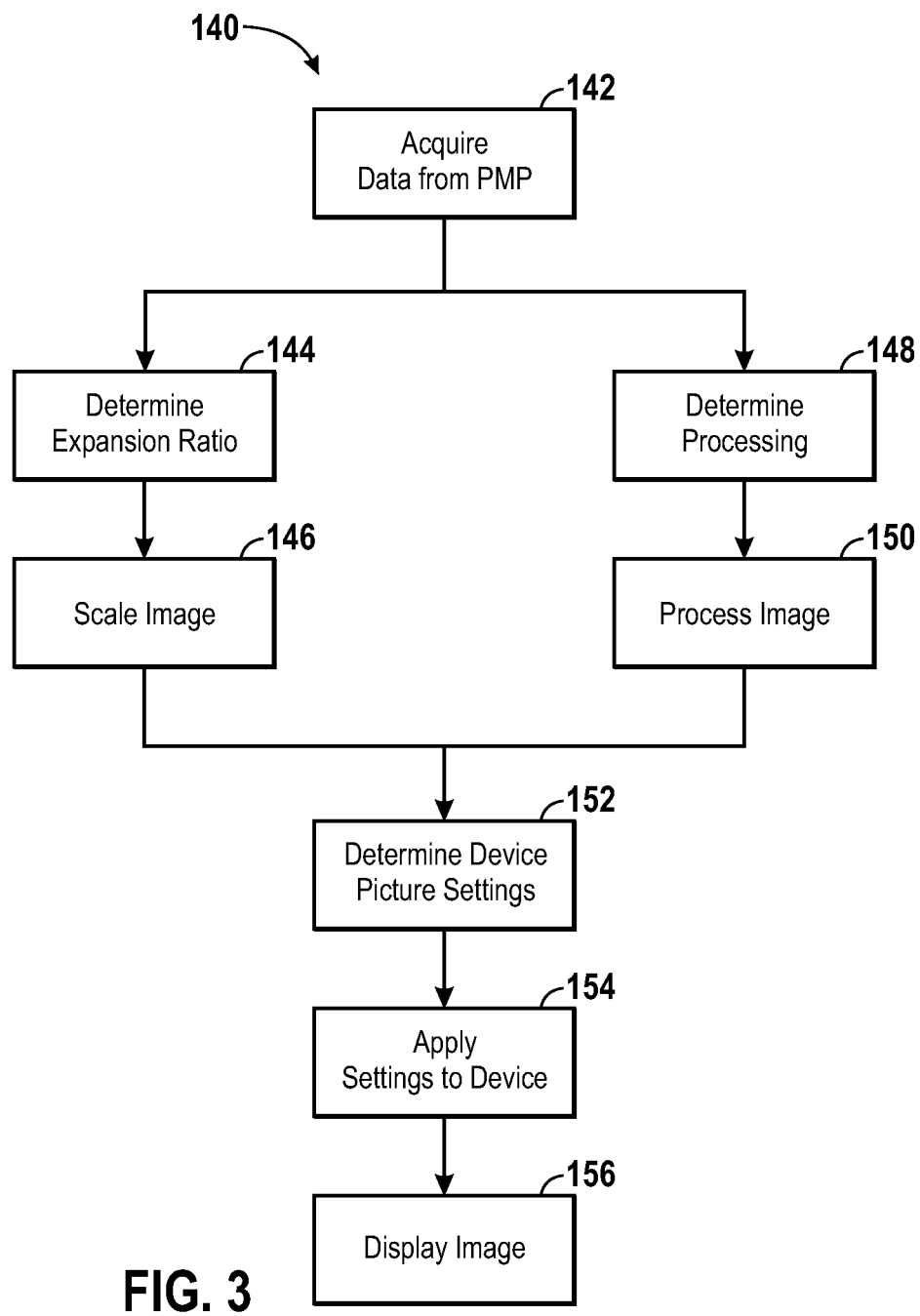
FIG. 3 is a process flow diagram of a method for operating an electronic device in accordance with present embodiments.

FIG. 3 is a process flow diagram of a method 140 for adjusting settings of an electronic device. In some embodiments, as those of ordinary skill in the art will appreciate, some steps may be modified, excluded, or additional steps may be included. The method begins by acquiring media file data from a portable media player (step 142). The media file data includes information about a media filed stored on the portable media player 108 (FIG. 1), such as the resolution of the file (i.e. 320×240, 640×480 etc.), the encoding format (i.e., MPEG-4, WMV, AVC, etc.), and the media type (i.e., movie, television program, etc.). According to present embodiments, the electronic device 100 (FIG. 1) may request and receive the data using a protocol stored in the memory 120 (FIG. 1).

The electronic device may then use the media file data to determine a suitable expansion ratio for the media file (step 144). Indeed, according to a present embodiment, the control logic 122 (FIG. 1) may determine the expansion ratio using an algorithm or table stored in the memory 120 (FIG. 1) of the device 100 (FIG. 1). The expansion ratio may be based on the resolution of the media file. For example, a resolution of 320×240 may be expanded to a 25 inch diagonal display size. In certain embodiments, the expansion ratio may be determined by the portable media player setting 136 (FIG. 2). For example, when the setting "PMP High Res" (see FIG. 2) is selected, the control logic 122 may be configured to expand the media file by a set percentage.

In some embodiments, additional factors may be used to determine the expansion ratio. For example, user preferences, such as the viewing distance, may be entered by a user and stored within the memory 120 (FIG. 1). The electronic device may be configured to account for these preferences when determining the expansion ratio (step 144).

Once the expansion ratio has been determined, the image or series of images from the media file are scaled (step 146) using the expansion ratio. The image may include a picture, video, television broadcast, or other suitable image stored on the portable media player 108 (FIG. 1). The image may be copied locally to the electronic device 100 (FIG. 1), or the image may be streamed from the portable media player 108 (FIG. 1) to the electronic device 100 (FIG. 1).

The electronic device also may use the media file data to determine a video processing algorithm (step 148). The video processing determination (step 148) may be performed simultaneously with the expansion ratio determination (step 144), or the processing determination (step 148) may be performed before or after the expansion ratio determination (step 144). According to present embodiments, the control logic 122 (FIG. 1) may be configured to select a video processing algorithm from several video processing algorithms included in the device 100 (FIG. 1). For example, the processor may be configured to perform several types of processing algorithms, such as deblocking, smoothing, regenerating, filtering, and other suitable processing functions and/or algorithms. In some embodiments, the selected video processing may include a combination of processing algorithms, and in other embodiments, the control logic 122 may determine that no additional video processing is required. The control logic 122 may select the processing algorithm using the media file data acquired from the portable media player 108 (FIG. 1). According to present embodiments, algorithms or tables may be used to select the processing method. In other embodiments, the portable media player setting 136 (FIG. 2) may determine the processing algorithm. Once the processing algorithm has been determined, the image is processed (step 150). According to present embodiments, the processor 118 may be configured to process the image using the selected algorithm. Of course, if no processing is required, this step may be omitted.

The control logic 122 (FIG. 1) may then determine the picture settings for the electronic device 100 (FIG. 1). The picture settings may include settings that determine how an image is viewed on the display subsystem 112 (FIG. 1). For example, the picture settings may include the brightness, color, sharpness, and contrast. According to present embodiments, the control logic 122 may use the media file data to determine the picture settings. For example, if the media file data includes information that the media file is a movie, the control logic 122 may decrease the contrast. In another example, if the media file data includes information that the media file has a low resolution, the control logic 122 may decrease the sharpness. The control logic 122 may input the media file data into algorithms or tables stored within the memory 120 in order to determine the picture settings.

According to certain embodiments, the portable media player settings 136 (FIG. 2) also may be used to determine the picture settings. For example, each setting 136 may have corresponding tables and algorithms stored within the memory 120 that may be used in conjunction with the media file data to determine the picture settings. In certain embodiments, the picture settings also may depend on the expansion ratio that was applied and the video processing algorithm that was used.

Once the picture settings have been determined, the settings are applied to the electronic device (step 154). According to present embodiments, the control logic 122 may be configured to set the display subsystem 112 to the selected picture settings. After the settings have been applied, the image from the portable media player may be displayed on the electronic device (step 156). According to present embodiments, the image may be displayed on the display subsystem 112 (FIG. 1) of the electronic device.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the following appended claims. Moreover, the order or sequence of any method steps may be varied or re-sequenced according to alternative embodiments.

What is claimed is:

1. An electronic device, comprising:
   a display subsystem configured to display an image stored on a portable media player;
   a media input configured to receive the image and corresponding media file data from the portable media player;
   a display control logic configured to determine video settings based on the media file data and apply the settings to the electronic device, wherein the video settings comprise a sharpness setting for the display subsystem, a brightness setting for the display subsystem, and a contrast setting for the display subsystem; and a processor configured to process the image for display on the electronic device with a video processing algorithm selected from a plurality of video processing algorithms stored within the electronic device, wherein the video processing algorithm is selected based on the media file data, and wherein the plurality of video processing algorithms comprise a deblocking algorithm, a smoothing algorithm, and a filtering algorithm.

2. The device of claim 1, wherein the video settings include an expansion ratio and the media file data includes a pixel resolution.

3. The device of claim 2, wherein the display control logic is configured to apply a first expansion ratio for a first pixel resolution and a second expansion ratio for a second pixel resolution.

4. The device of claim 1, comprising a memory configured to store portable media player settings that affect the video settings and a user interface that allows selection of the portable media player settings.

5. The device of claim 1, wherein the video settings include an expansion ratio that is computed using a pixel resolution included in the media file data.

6. The device of claim 1, wherein the control logic is configured to decrease the sharpness setting for a low resolution image and increase the sharpness setting for a high resolution image.

7. The device of claim 1, wherein the media file data includes a media type designation and the control logic is configured to select a preset picture setting for the display subsystem that corresponds to the media type.

8. The device of claim 1, wherein the media input is configured to receive a plurality of images streamed from the portable media player and the processor is configured to process each of the images using the video settings.

9. A method of operating an electronic device, comprising:
acquiring media file data from a portable media player;
determining video settings based on the media file data;
applying the video settings to the electronic device;
selecting a video processing algorithm from a plurality of video processing algorithms stored within the electronic device, wherein the video processing algorithm is selected based on the media file data, and wherein the plurality of video processing algorithms comprise a deblocking algorithm, a smoothing algorithm, and a filtering algorithm;
processing the image using the selected video processing algorithm; and
displaying an image on the electronic device, the image corresponding to the media file data.

10. The method of claim 9, wherein the video settings include at least one of an expansion ratio and a sharpness setting.

11. The method of claim 9, wherein the media file data includes a pixel resolution for the image.

12. The method of claim 9, wherein determining the video settings includes calculating an expansion ratio for the image using the media file data.

13. The method of claim 9, wherein determining the video settings includes determining a sharpness setting for a display subsystem of the electronic device using the media file data.

14. The method of claim 9, wherein the determining the video settings includes selecting a picture setting for a display subsystem of the electronic device, the picture setting corresponding to a preset combination of settings including at least one of a sharpness setting and a contrast setting and being selected based on the media file data.

15. A television, comprising:
a media input for connecting the television to a portable media player;
a display control logic configured to acquire pixel resolution data from the portable media player and determine an expansion ratio based on the resolution data;
a processor configured to receive an image corresponding to the resolution data from the portable media player, expand the image using the expansion ratio, and apply video processing algorithms to the image, wherein the video processing algorithms comprises a deblocking algorithm, a smoothing algorithm, and a filtering algorithm.

16. The television of claim 15, comprising:
a display subsystem configured to display the expanded image; and
a user interface for receiving user preferences that affect the expansion ratio.

17. The television of claim 16, wherein the display subsystem includes a sharpness setting and the display control logic is configured to adjust the sharpness setting based on the resolution data.

18. The television of claim 15, wherein the display control logic is configured to determine a first expansion ratio for low resolution data and a second expansion ratio for higher resolution data, wherein the first expansion ratio is smaller than the second expansion ratio.

19. The electronic device of claim 1, wherein the display control logic is configured to automatically select a predetermined video setting based on the media file data and apply the predetermined video setting to the electronic device, wherein the predetermined video setting comprise a combination of specific values for the brightness, sharpness, and contrast settings and are preset and stored in a memory of the electronic device.

* * * * *